US 10,866,338 B2

(12) United States Patent
Hayashi et al.

(10) Patent No.: US 10,866,338 B2
(45) Date of Patent: Dec. 15, 2020

(54) DROPLET TIMING SENSOR

(71) Applicant: Gigaphoton Inc., Tochigi (JP)

(72) Inventors: Hideyuki Hayashi, Oyama (JP);
Takeshi Okamoto, Oyama (JP)

(73) Assignee: Gigaphoton Inc., Tochigi (JP)

( * ) Notice: Subject to any disclaimer, the term of this patent is extended or adjusted under 35 U.S.C. 154(b) by 350 days.

(21) Appl. No.: 16/058,000

(22) Filed: Aug. 8, 2018

(65) Prior Publication Data

US 2018/0348397 A1    Dec. 6, 2018

Related U.S. Application Data

(63) Continuation of application No. PCT/JP2016/059012, filed on Mar. 22, 2016.

(51) Int. Cl.
*G01V 8/10* (2006.01)
*H05G 2/00* (2006.01)

(52) U.S. Cl.
CPC ............. *G01V 8/10* (2013.01); *H05G 2/006* (2013.01); *H05G 2/008* (2013.01)

(58) Field of Classification Search
CPC . G01V 8/10; G01V 8/12; H05G 2/006; H05G 2/008; H05G 2/003; H05G 2/001; H05G 2/00
See application file for complete search history.

(56) References Cited

U.S. PATENT DOCUMENTS

| | | | |
|---|---|---|---|
| 10,172,225 B2* | 1/2019 | Suzuki | H05G 2/008 |
| 2010/0220756 A1* | 9/2010 | Krzysztof | H01S 3/2383 |
| | | | 372/38.02 |
| 2013/0032735 A1* | 2/2013 | Nowak | H01S 3/2316 |
| | | | 250/504 R |

(Continued)

FOREIGN PATENT DOCUMENTS

| JP | 2007-139494 A | 6/2007 |
|---|---|---|
| JP | 4730898 B2 | 7/2011 |

(Continued)

OTHER PUBLICATIONS

International Search Report issued in PCT/JP2016-059012; dated Jun. 21, 2016.

(Continued)

*Primary Examiner* — John R Lee
(74) *Attorney, Agent, or Firm* — Studebaker & Brackett PC

(57) ABSTRACT

A droplet timing sensor that detects droplet passage timing by receiving a light from a light source unit with which a droplet is irradiated in an extreme ultraviolet light generating apparatus eliminates an influence of droplet passage on light source control for obtaining a constant light income. The droplet timing sensor includes: a light source unit configured to irradiate a droplet with an illumination light at a predetermined position; a light receiving unit (70) configured to receive the illumination light having passed through the predetermined position and detect a change in a light income; and a light source controller (301) configured to obtain a frequency distribution of light incomes measured multiple times with time using a statistical processing unit (76), and control an output of the light source unit based on a light income at maximum frequency.

13 Claims, 13 Drawing Sheets

(56) References Cited

U.S. PATENT DOCUMENTS

| | | | |
|---|---|---|---|
| 2013/0209077 A1* | 8/2013 | Yabu | F24H 1/0018 |
| | | | 392/441 |
| 2015/0189730 A1 | 7/2015 | Moriya et al. | |
| 2016/0234920 A1* | 8/2016 | Suzuki | H05G 2/008 |
| 2017/0079126 A1* | 3/2017 | Suzuki | H05G 2/005 |
| 2018/0146536 A1* | 5/2018 | Suzuki | G03F 7/70033 |
| 2018/0348397 A1* | 12/2018 | Hayashi | G01V 8/10 |
| 2019/0150260 A1* | 5/2019 | Yanagida | G03F 7/70025 |
| | | | 250/504 R |
| 2019/0358952 A1* | 11/2019 | Wakana | B41J 2/175 |

FOREIGN PATENT DOCUMENTS

| | | |
|---|---|---|
| JP | 2013-094611 A | 5/2013 |
| WO | 2014/042003 A1 | 3/2014 |

OTHER PUBLICATIONS

The International Preliminary Report on Patentability (Chapter I) and Translation of Written Opinion of the International Searching Authority; PCT/JP2016-059012; dated Sep. 25, 2018.

* cited by examiner

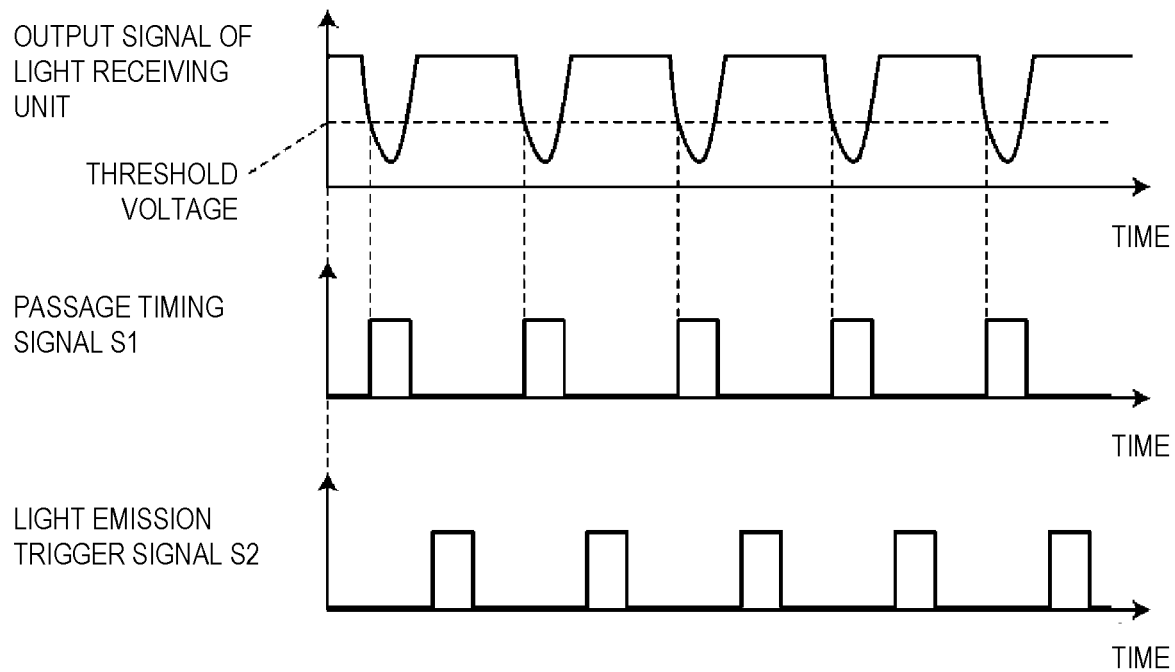
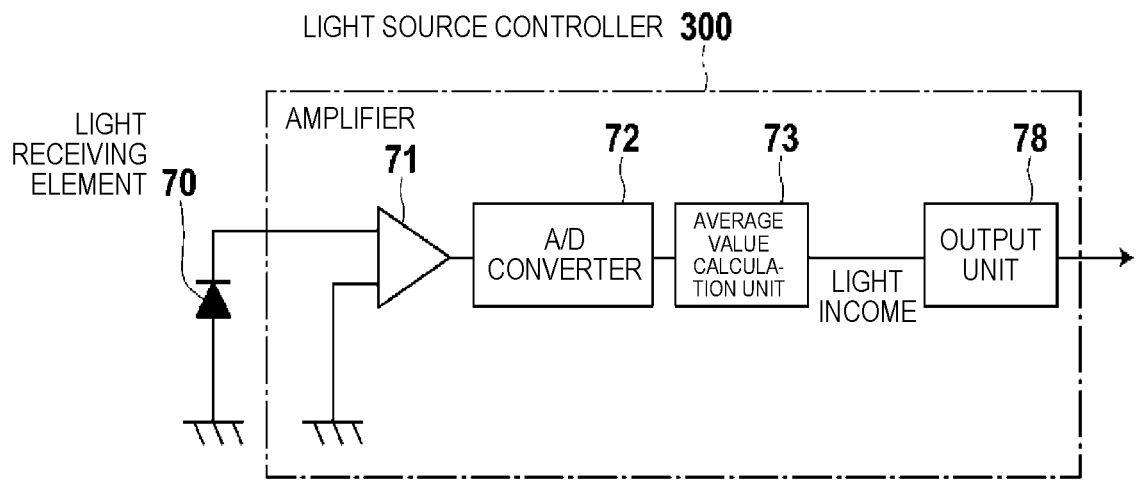

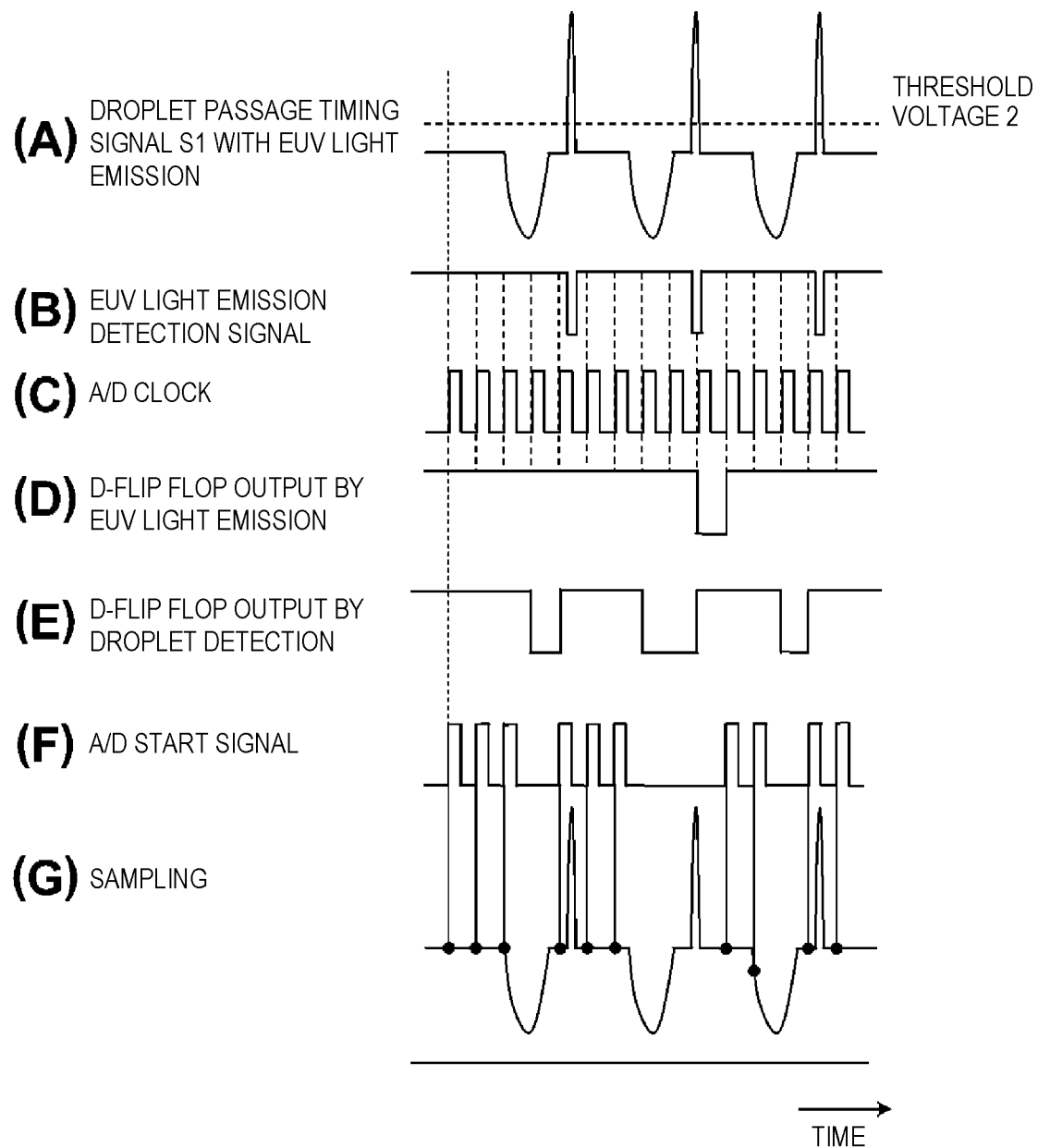

DROPLET TIMING SENSOR

CROSS-REFERENCE TO RELATED APPLICATIONS

The present application is a continuation application of International Application No. PCT/JP2016/059012 filed on Mar. 22, 2016. The content of the application is incorporated herein by reference in its entirety.

BACKGROUND

1. Technical Field

The present disclosure relates to a droplet timing sensor that detects droplet passage timing in an extreme ultraviolet light generating apparatus.

2. Related Art

Recently, with miniaturization of semiconductor processes, miniaturization of transfer patterns for use in photolithography of the semiconductor processes has been rapidly developed. In the next generation, microfabrication at 20 nm or less will be in demand. Thus, in order to meet the demand for the microfabrication at, for example, 20 nm or less, there is expectation for development of an exposure apparatus including a combination of an extreme ultraviolet (EUV) light generating apparatus configured to generate an extreme ultraviolet light having a wavelength of 13.5 nm and reduced projection reflective optics.

Three types of EUV light generating apparatuses have been proposed: a laser produced plasma (LPP) type apparatus using plasma generated by irradiating a target material with a pulsed laser beam, a discharge produced plasma (DPP) type apparatus using plasma generated by discharge, and a free electron laser apparatus using electrons output from an electron accelerator.

LIST OF DOCUMENTS

Patent Documents

Patent Document 1: International Patent Publication No. 2014/042003
Patent Document 2: Japanese Patent No. 4730898

SUMMARY

A droplet timing sensor according to an aspect of the present disclosure that detects timing when a droplet passes through a predetermined position, the droplet being intermittently supplied into a chamber of an extreme ultraviolet light generating apparatus and irradiated with a laser beam to generate an extreme ultraviolet light, includes: a light source unit configured to irradiate the droplet supplied into the chamber with an illumination light at the predetermined position; a light receiving unit configured to receive the illumination light having passed through the predetermined position and detect a change in a light income; and a light source controller configured to obtain a frequency distribution of light incomes measured multiple times with time, and control an output of the light source unit based on a light income at maximum frequency.

A droplet timing sensor according to another aspect of the present disclosure that detects timing when a droplet passes through a predetermined position, the droplet being intermittently supplied into a chamber of an extreme ultraviolet light generating apparatus and irradiated with a laser beam to generate an extreme ultraviolet light, includes: a light source unit configured to irradiate the droplet supplied into the chamber with an illumination light at the predetermined position; a light receiving unit configured to receive the illumination light having passed through the predetermined position and detect a change in a light income; and a light source controller configured to extract only a light income having a difference from a target value within a predetermined value from light incomes measured multiple times with time, and control an output of the light source unit based on the extracted light income.

A droplet timing sensor according to a further aspect of the present disclosure that detects timing when a droplet passes through a predetermined position, the droplet being intermittently supplied into a chamber of an extreme ultraviolet light generating apparatus and irradiated with a laser beam to generate an extreme ultraviolet light, includes: a light source unit configured to irradiate the droplet supplied into the chamber with an illumination light at the predetermined position; a light receiving unit configured to receive the illumination light having passed through the predetermined position and detect a change in a light income; and a light source controller configured to sample a signal output from the light receiving unit with time only in a period except when the signal is influenced by passage of the droplet to obtain a light income, and control an output of the light source unit based on the light income.

BRIEF DESCRIPTION OF THE DRAWINGS

With reference to the accompanying drawings, some embodiments of the present disclosure will be described below merely by way of example.

FIG. 3 is a timing chart of output timing of various signals in the EUV light generating apparatus in FIG. 1.

FIG. 4 is a schematic view of a light source controller of the droplet timing sensor in FIG. 2.

FIG. 17 illustrates, at (A), (B), (C), (D), (E), (F) and (G), an action of the light source controller in FIG. 16.

DESCRIPTION OF EMBODIMENTS

Figure 1:
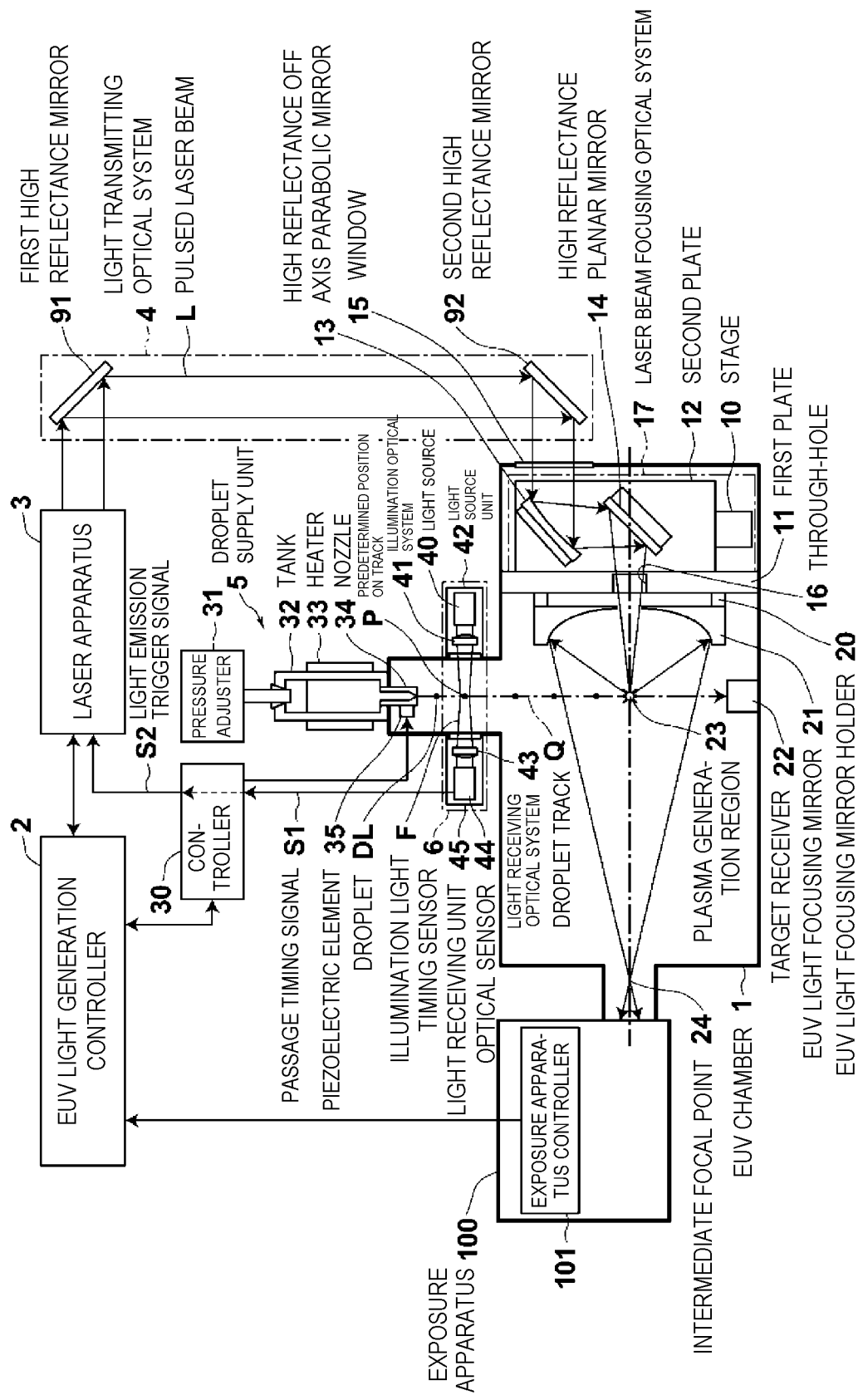
FIG. 1 is a schematic side view of a general configuration of a typical EUV light generating apparatus.

<Contents>
1. General Description of EUV Light Generating Apparatus
   1.1 Configuration
   1.2 Operation
2. Comparative Example
   2.1 Configuration
   2.2 Operation
   2.3 Problem
3. Embodiment 1
   3.1 Configuration of Embodiment 1
   3.2 Operation of Embodiment 1
   3.3 Effect of Embodiment 1
4. Embodiment 2
   4.1 Configuration of Embodiment 2
   4.2 Operation of Embodiment 2
   4.3 Effect of Embodiment 2
5. Embodiment 3
   5.1 Configuration of Embodiment 3
   5.2 Operation of Embodiment 3
   5.3 Effect of Embodiment 3
6. Embodiment 4
   6.1 Configuration of Embodiment 4
   6.2 Operation of Embodiment 4
   6.3 Effect of Embodiment 4
7. Embodiment 5
   7.1 Configuration of Embodiment 5
   7.2 Operation of Embodiment 5
   7.3 Effect of Embodiment 5

Now, with reference to the drawings, embodiments of the present disclosure will be described in detail. The embodiments described below illustrate some examples of the present disclosure, and do not limit contents of the present disclosure. Also, all configurations and operations described in the embodiments are not necessarily essential as configurations and operations of the present disclosure. Like components are denoted by like reference numerals, and overlapping descriptions are omitted.

1. General Description of EUV Light Generating Apparatus

1.1 Configuration

FIG. 1 is a schematic side view of a general configuration of a typical extreme ultraviolet (EUV) light generating apparatus. The EUV light generating apparatus in FIG. 1 is configured to supply an EUV light used as an exposure light to an exposure apparatus 100. Specifically, components other than the exposure apparatus 100 and an exposure apparatus controller 101 in FIG. 1 constitute the EUV light generating apparatus. The EUV light generating apparatus in this example is a laser produced plasma (LPP) type apparatus configured to irradiate a target material with a laser beam to excite the target material and thus generate an EUV light. The EUV light generating apparatus includes an EUV chamber 1, an EUV light generation controller 2, a laser apparatus 3, a light transmitting optical system (beam delivery system) 4, a droplet supply unit 5, and a droplet timing sensor (hereinafter simply referred to as a timing sensor) 6.

The EUV chamber 1 is a chamber for generating an EUV light therein, and preferably, a vacuum chamber. The EUV chamber 1 includes a stage 10, a first plate 11, a second plate 12 held by the EUV chamber 1 via the stage 10, a high reflectance off axis parabolic mirror 13 held by the second plate 12, a high reflectance planar mirror 14 similarly held by the second plate 12, and a window 15 for introducing a laser beam. The first plate 11 has a through-hole 16 for introducing the laser beam. The high reflectance off axis parabolic mirror 13 and the high reflectance planar mirror 14 constitute a laser beam focusing optical system 17 for focusing a pulsed laser beam L described later.

The EUV chamber 1 further includes an EUV light focusing mirror holder 20, an EUV light focusing mirror 21 held by the EUV light focusing mirror holder 20, and a target receiver 22. The EUV light focusing mirror 21 is a mirror having, for example, a spheroidal reflection surface and placed so that a first focus is located in a plasma generation region 23 and a second focus is located in an intermediate focal point (IF) 24.

The laser apparatus 3 generates the pulsed laser beam L for exciting a target material. As the laser apparatus 3, a master oscillator power amplifier type laser apparatus is applied as an example. Alternatively, as the laser apparatus 3, a combination of an yttrium aluminum garnet (YAG) laser apparatus configured to generate a pre-pulsed laser beam, and a $CO_2$ laser apparatus configured to generate a main pulsed laser beam may be applied. Further, other laser apparatuses may be used as the laser apparatus 3. The pulsed laser beam L output from the laser apparatus 3 has, for example, a pulse width of several nanometers to several tens of nanometers and a frequency of about 10 kHz to 100 kHz.

The light transmitting optical system 4 includes a first high reflectance mirror 91 configured to reflect the pulsed laser beam L output from the laser apparatus 3 to change a traveling direction thereof, and a second high reflectance mirror 92 configured to reflect the pulsed laser beam L reflected by the first high reflectance mirror 91 toward the window 15.

The droplet supply unit 5 supplies a target material, in the form of a spherical droplet DL, such as tin (Sn) or lithium (Li) used for generating an EUV light into the EUV chamber 1. The droplet supply unit 5 includes a controller 30, a pressure adjuster 31, a tank 32 storing a molten target material, a heater 33 for melting the target material, a nozzle 34 for discharging the molten target material, and a piezoelectric element 35 configured to vibrate a side wall of the nozzle 34. The droplet DL is intermittently and periodically generated and travels on a droplet track Q in the EUV chamber 1.

The timing sensor 6 includes a light source unit 42 including a light source 40 configured to emit an illumination light F and an illumination optical system 41. The illumination optical system 41 focuses the illumination light F in a predetermined position P on the droplet track Q. If the droplet DL exists in the position P, the droplet DL partially blocks the illumination light F. The timing sensor 6 also includes a light receiving unit 45 including a light receiving optical system 43 configured to focus the illumination light F and an optical sensor 44 configured to detect the focused illumination light F. The light receiving unit 45 is placed to face the light source unit 42.

Figure 2:
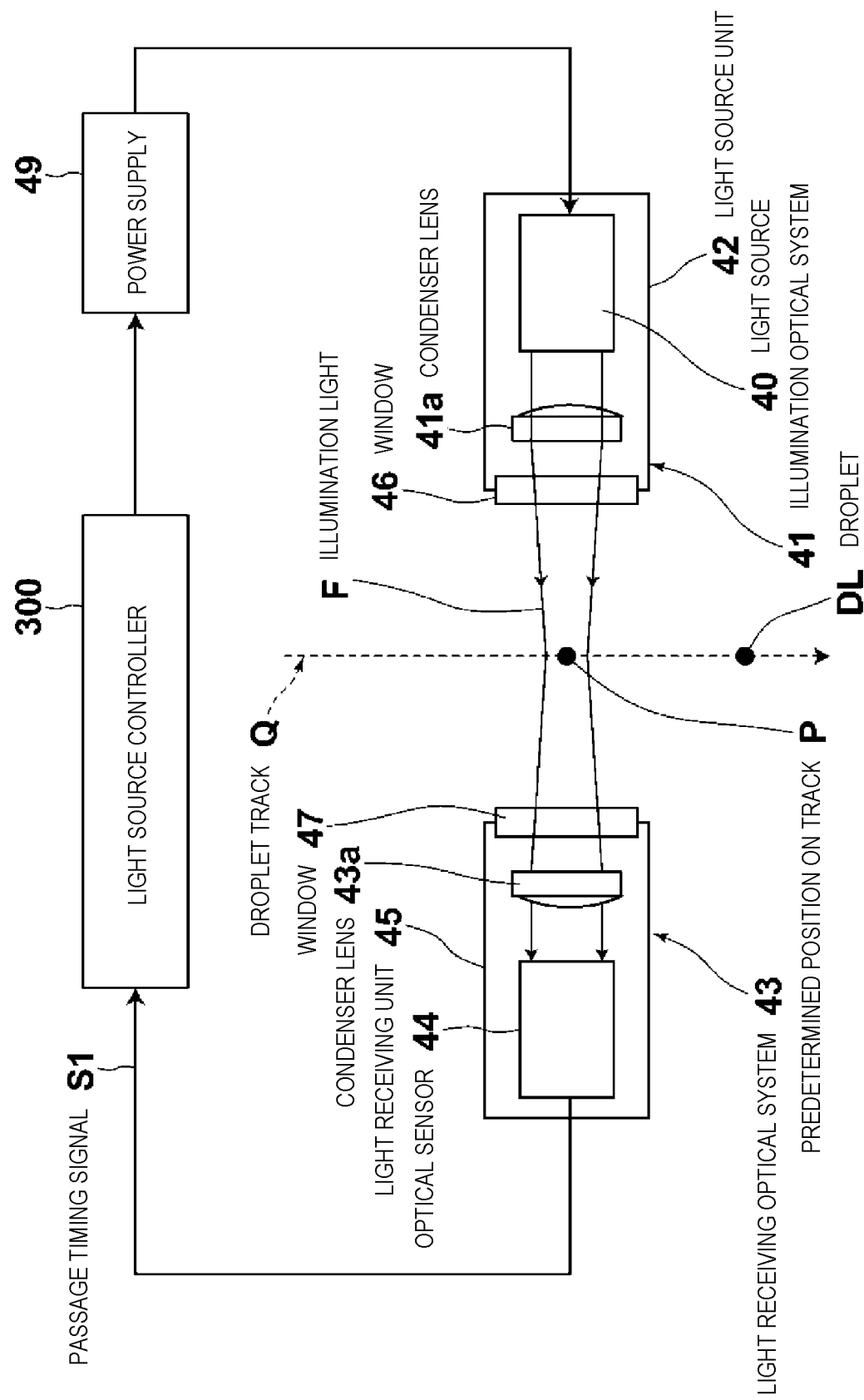
FIG. 2 is a schematic view of a droplet timing sensor as a comparative example.

FIG. 2 shows configurations of the light source unit 42 and the light receiving unit 45 described above in more detail. As shown in FIG. 2, the illumination optical system 41 includes, for example, a condenser lens 41a. The illumination light F having passed through the condenser lens 41a passes through a window 46 and is focused in the position P. As shown in FIG. 2, the light receiving optical system 43 includes, for example, a condenser lens 43a. The illumination light F focused in the position P and then diverged passes through a window 47 and enters the optical sensor 44.

1.2 Operation

In the above configuration, the target material in the tank 32 is heated to a predetermined temperature equal to or higher than a melting point by the heater 33. For example, if the target material is Sn, Sn is heated to a temperature range of 250° C. to 290° C. higher than its melting point (232° C.). For this heating, the controller 30 may control an operation of the heater 33 to adjust the temperature. The controller 30 also controls an operation of the pressure adjuster 31 so that pressure in the tank 32 is maintained at pressure at which a jet of the molten target material is output from the nozzle 34 at a predetermined speed. Then, the controller 30 applies a droplet supply signal that is a voltage signal having a predetermined waveform to the piezoelectric element 35 via a piezoelectric power supply (not shown). Then, the piezoelectric element 35 vibrates, and the vibration is applied to the nozzle 34. Thus, the jet output from the nozzle 34 is divided at a predetermined cycle by the vibration of the nozzle 34 to intermittently supply the droplet DL.

On the other hand, the illumination light F output from the light source unit 42 of the timing sensor 6 is received by the light receiving unit 45. When the droplet DL that is generated and drops as described above passes through the predetermined position P on the track Q, the droplet DL blocks the illumination light F. Then, a light income of the illumination light F detected by the light receiving unit 45 is reduced, and a signal level of an output signal output from the light receiving unit 45 is reduced with the reduction in the light income. Timing when the signal level becomes lower than a certain threshold voltage represents timing when the droplet DL passes through the predetermined position P. The output signal output from the light receiving unit 45 is input as a passage timing signal S1 to the controller 30. When detecting the reduction in the signal level of the input passage timing signal S1, the controller 30 outputs a light emission trigger signal S2 with a predetermined time delay from the point of time of the detection.

FIG. 3 is a timing chart of output timing of the output signal of the light receiving unit 45 in relation to the threshold voltage, the passage timing signal S1, and the light emission trigger signal S2 described above. In FIG. 3, the abscissa of the chart for each signal represents time and the ordinate represents a signal level. As shown in FIG. 3, the timing sensor 6 generates a detection pulse for the passage timing signal S1 in a period when the output signal of the light receiving unit 45 is reduced from a reference value and lower than the threshold voltage. Specifically, the passage timing signal S1 is ON in the period. Also, the light emission trigger signal S2 is ON in synchronization with the passage timing signal S1.

The light emission trigger signal S2 is input to the laser apparatus 3. When the light emission trigger signal S2 is input, the laser apparatus 3 outputs a pulsed laser beam L, for example, by opening a light shutter included therein. The pulsed laser beam L is reflected by the first high reflectance mirror 91 and the second high reflectance mirror 92 of the light transmitting optical system 4, then passes through the window 15 and enters the EUV chamber 1.

The pulsed laser beam L is reflected by the high reflectance off axis parabolic mirror 13 and the high reflectance planar mirror 14 of the laser beam focusing optical system 17, then passes through an opening provided at a center of the EUV light focusing mirror 21, and travels on an optical axis of the EUV light focusing mirror 21. The pulsed laser beam L is focused in the plasma generation region 23 by an action of the high reflectance off axis parabolic mirror 13. The droplet DL having reached the plasma generation region 23 is irradiated with the focused pulsed laser beam L and turned into plasma. Then, an EUV light is generated from the plasma. The droplet DL that is not irradiated with the pulsed laser beam L is received by the target receiver 22.

The droplet DL is periodically generated, and every time the droplet DL is detected by the timing sensor 6, the pulsed laser beam L is output. Thus, the EUV light is periodically generated. The EUV light periodically generated in this manner is focused in the intermediate focal point 24 and then enters the exposure apparatus 100. In the exposure apparatus 100, the incident EUV light is used for semiconductor exposure or the like.

The plasma generation region 23 is sometimes moved according to an instruction from the exposure apparatus 100. If the plasma generation region 23 is moved in parallel with the droplet track Q, a time delay between when the controller 30 detects the reduction in the signal level of the passage timing signal S1 and when the controller 30 outputs the light emission trigger signal S2 may be changed. If the plasma generation region 23 is moved in a plane perpendicular to the droplet track Q, the stage 10 may be actuated to move the high reflectance off axis parabolic mirror 13 and the high reflectance planar mirror 14 via the second plate 12 in the plane perpendicular to the droplet track Q.

2. Comparative Example

2.1 Configuration

Next, with reference to FIGS. 2 and 4, the timing sensor 6 will be described in more detail. As shown in FIG. 2, the passage timing signal S1 output from the optical sensor 44 is input to the light source controller 300. The light source controller 300 constitutes a part of the timing sensor 6 in FIG. 1. The light source controller 300 controls an operation of a power supply 49 of the light source 40 to maintain a constant light income of the illumination light F detected by the optical sensor 44 when no droplet DL exists in the position P on the droplet track Q. Specifically, for example, contaminant or the like adhering to the windows 46, 47 in FIG. 2 may reduce the light income by the optical sensor 44 and hinder accurate detection of passage of the droplet DL, which should be desirably prevented. This will be described in more detail. As described above, the output signal of the optical sensor 44 of the light receiving unit 45 and a certain threshold voltage are compared to detect the passage timing of the droplet DL based on a change in a level relationship therebetween. As the position of the droplet DL moves farther from the center of the illumination light F, the output signal level of the optical sensor 44 is reduced. Then, to ensure a measurable region, the threshold voltage is set to a value as close as possible to the output of the optical sensor 44 in normal time (when no droplet is detected). Thus, if the light income by the optical sensor 44 is reduced to reduce the sensor output to around the threshold voltage, it becomes difficult to accurately detect the passage timing of the droplet DL. In this example, the light source controller 300 is provided separately from the controller 30 in FIG. 1, but the controller 30 may be configured to also serve as a light source controller.

2.2 Operation

FIG. 4 shows a specific configuration of the light source controller 300. In this example, this configuration includes an amplifier 71, an A/D converter 72, an average value calculation unit 73, and an output unit 78. The light receiving element 70 in FIG. 4 constitutes the optical sensor 44 in FIG. 2. In the configuration in FIG. 4, an output signal of the light receiving element 70 is amplified by the amplifier 71. The amplified signal is sampled and digitized at a predetermined cycle by the A/D converter 72, and the digitized light amount signal is input to the average value calculation unit 73. The average value calculation unit 73 calculates an average value of a predetermined number of, for example, about 100 digitized light amount signals sequentially input, and outputs the average value as a light income. Then, the output unit 78 outputs a signal to control the operation of the power supply 49 of the light source 40 so as to increase intensity of the illumination light F if the light income is reduced, while reduce the intensity of the illumination light F if the light income is increased, and the power supply 49 is controlled in that manner.

2.3 Problem

Figure 5:
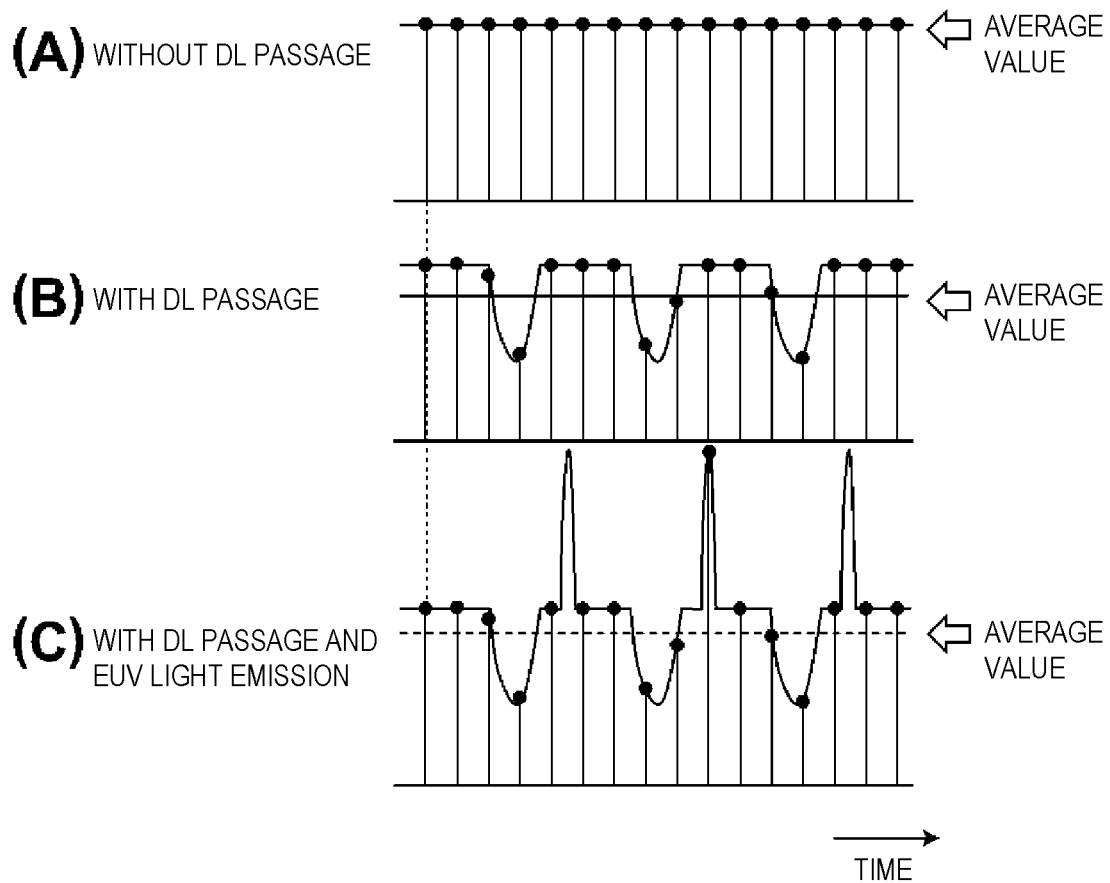
FIG. 5 illustrates, at (A), (B) and (C), an action of the light source controller in FIG. 4.

However, even if the operation of the power supply 49 is controlled as described above, the passage of the droplet DL sometimes cannot be accurately detected. This will be described below with reference to FIG. 5. Lines or curves in (A), (B), and (C) of FIG. 5 show output signals of the light receiving element 70 amplified by the amplifier 71 in FIG. 4. Black dots show sampling points in sampling by the A/D converter 72.

In FIG. 5, the abscissa represents time, and (A), (B), and (C) of FIG. 5 show outline waveforms of output signals each indicating a signal level with a height. FIG. 5 uses a simplified representation without the abscissa and the ordinate for each signal, but if including the abscissa and the ordinate for each signal, the representation of FIG. 5 is similar to that of FIG. 3. This simplified representation is also used in FIGS. 7, 9, 13, 15, and 17 described later. In FIG. 5, the droplet DL is abbreviated as "DL" (hereinafter the same). (A) of FIG. 5 shows an output signal of the light receiving element 70 when no droplet DL passes through the position P on the droplet track Q. In this case, the output signal of the light receiving element 70 does not vary as shown, and thus an average value of the output signal, that is, an average value of the light income can be accurately obtained.

(B) of FIG. 5 shows an output signal of the light receiving element 70 when the droplet DL passes through the position P on the droplet track Q. In this case, the droplet DL blocks the illumination light F, and the output signal of the light receiving element 70 is periodically reduced as shown. Thus, the average value of the light income should be originally equal to the light income indicated by the output signal at a maximum level in (B) of FIG. 5, but is actually lower than that.

(C) of FIG. 5 shows an output signal of the light receiving element 70 when the droplet DL passes through the position P on the droplet track Q and also when EUV light emission occurs. In this case, the droplet DL blocks the illumination light F, and the output signal of the light receiving element 70 is periodically reduced as shown. Also, the EUV light is sometimes detected by the light receiving element 70 to increase the output signal of the light receiving element 70. However, an EUV light emission time is shorter than a time for the droplet DL blocking the illumination light F. Thus, frequency of the increased output signal being sampled is considerably lower than frequency of the reduced output signal being sampled as described above. Thus, eventually, also in this case, the average value of the light income should be originally equal to the light income indicated by the output signal at a maximum level in (C) of FIG. 5, but is actually lower than that.

As described above, typically, the output signal of the optical sensor 44 of the light receiving unit 45 and a certain threshold voltage are compared to detect the passage timing of the droplet DL based on the change in the level relationship therebetween. However, if the average value of the light income on which control of the intensity of the illumination light F is based varies as shown in (B) and (C) of FIG. 5, the intensity of the illumination light F may vary accordingly. Then, the level relationship changes depending on passage or non-passage of the droplet DL and also on the intensity of the illumination light F, which makes it difficult to accurately detect the passage timing of the droplet DL.

Figure 6:
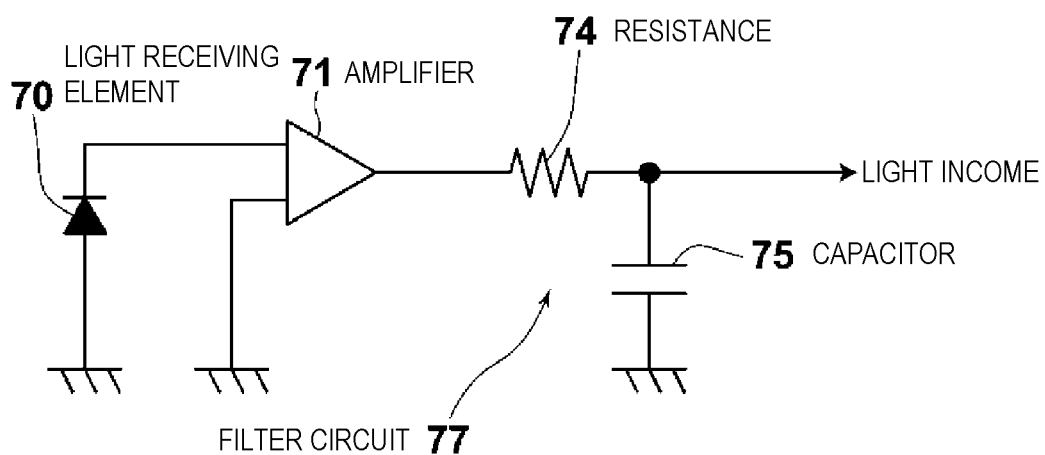
FIG. 6 is a schematic view of another example of a light source controller applied to the EUV light generating apparatus in FIG. 1.
Figure 7:
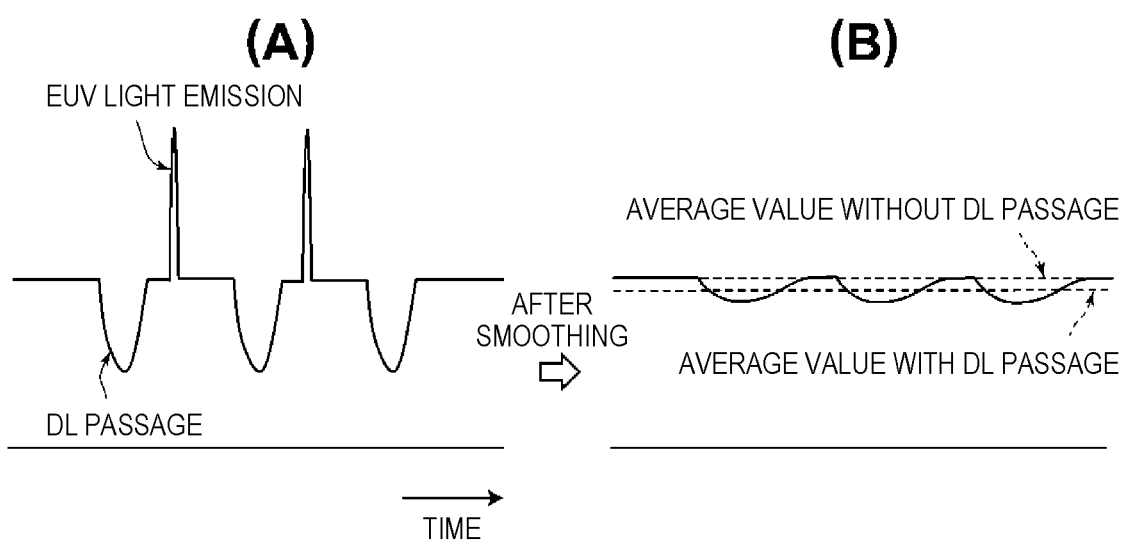
FIG. 7 illustrates, at (A) and (B), an action of the light source controller in FIG. 6.

It is conceivable that a filter circuit 77 including a resistance 74 and a capacitor 75 in FIG. 6 smooths the output signal of the light receiving element 70 amplified by the amplifier 71. For the case of such smoothing, a waveform of the output signal of the light receiving element 70 is shown in (A) of FIG. 7, and a waveform of the output signal after smoothing is shown in (B) of FIG. 7. Also in this case, average values of the signal after smoothing are different between with and without the passage of the droplet DL, and eventually, similarly to the above, it becomes difficult to accurately detect the passage timing of the droplet DL.

3. Embodiment 1

3.1 Configuration of Embodiment 1

Figure 8:
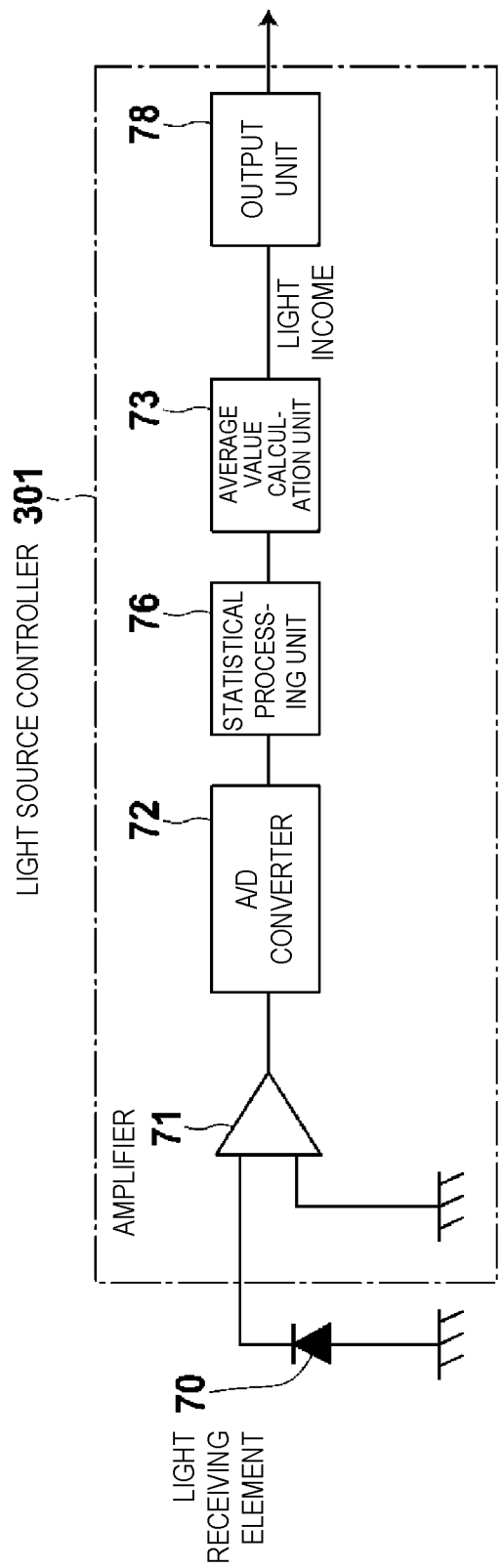
FIG. 8 is a schematic view of a light source controller of a droplet timing sensor according to Embodiment 1.

Next, with reference to FIGS. 8 and 9, a timing sensor according to Embodiment 1 will be described. The timing sensor of this embodiment is different from the timing sensor 6 of the comparative example in that it includes a light source controller 301 having a configuration different from that of the light source controller 300 in FIG. 4. FIG. 8 shows the configuration of the light source controller 301. In FIG. 8, the same components as in the light source controller 300 in FIGS. 2 and 4 are denoted by the same reference numerals, and descriptions thereof will be omitted unless they are required (hereinafter the same). The light source controller 301 in FIG. 8 is different from the light source controller 300 in FIGS. 2 and 4 in that it includes a statistical processing unit 76 between the A/D converter 72 and the average value calculation unit 73.

3.2 Operation of Embodiment 1

In the configuration in FIG. 8, an output signal of a light receiving element 70 is amplified by an amplifier 71. The amplified signal is sampled and digitized at a predetermined cycle by the A/D converter 72. The digitized light amount signal (sample data) is input to the statistical processing unit 76. The statistical processing unit 76 prepares a histogram of the input light amount signal, and extracts only the light amount signal in a class at maximum frequency from the histogram. The extracted signal at maximum frequency is input to the average value calculation unit 73. The average value calculation unit 73 calculates an average value of the extracted signal only, and outputs the average value as a light income. The average value indicating the light income is used for the light source controller 301 controlling an operation of a power supply 49 in FIG. 2 as in the comparative example. Specifically, an output unit 78 controls the operation of the power supply 49 of a light source 40 so as to increase intensity of an illumination light F if the average value is reduced, and reduce the intensity of the illumination light F if the average value is increased.

3.3 Effect of Embodiment 1

Figure 9:
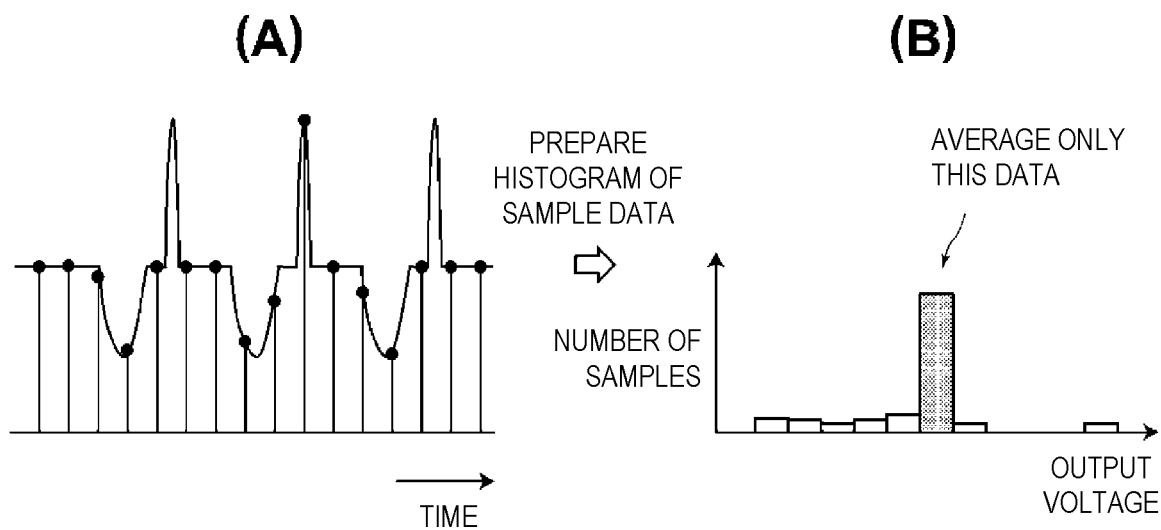
FIG. 9 illustrates, at (A) and (B), an action of the light source controller in FIG. 8.

(A) of FIG. 9 shows an outline waveform of the amplified light amount signal, and shows sampling points in sampling of the light amount signal by the A/D converter 72A with black dots. (B) of FIG. 9 shows an example of the histogram. (B) of FIG. 9 assumes that the digitized light amount signal (sample data) is a voltage signal.

As is apparent from (A) of FIG. 9, if the sampling cycle is set to be shorter than the passage cycle of the droplet L through the predetermined position P in FIG. 1, many light amount signals are sampled that are not influenced by disturbance such as passage of the droplet DL or EUV light emission. Thus, in the histogram, such light amount signals have maximum frequency. Then, if the operation of the power supply 49 is controlled based on the average value of the signal extracted from the histogram as described above, a light emission amount of the light source 40 is favorably controlled to a proper value at which the signal is not influenced by the disturbance.

The sampling cycle is desirably set to be shorter than the passage cycle of the droplet DL through the predetermined position P. For example, when the passage cycle of the droplet DL is about $10^{-5}$ seconds, the sampling cycle is desirably half or less, and more preferably one fifth or less of the passage cycle. The passage cycle of the droplet DL of $10^{-5}$ seconds is 100 kHz in terms of frequency. In that case, sampling frequency is desirably set to 500 kHz or higher.

4. Embodiment 2

4.1 Configuration of Embodiment 2

Figure 10:
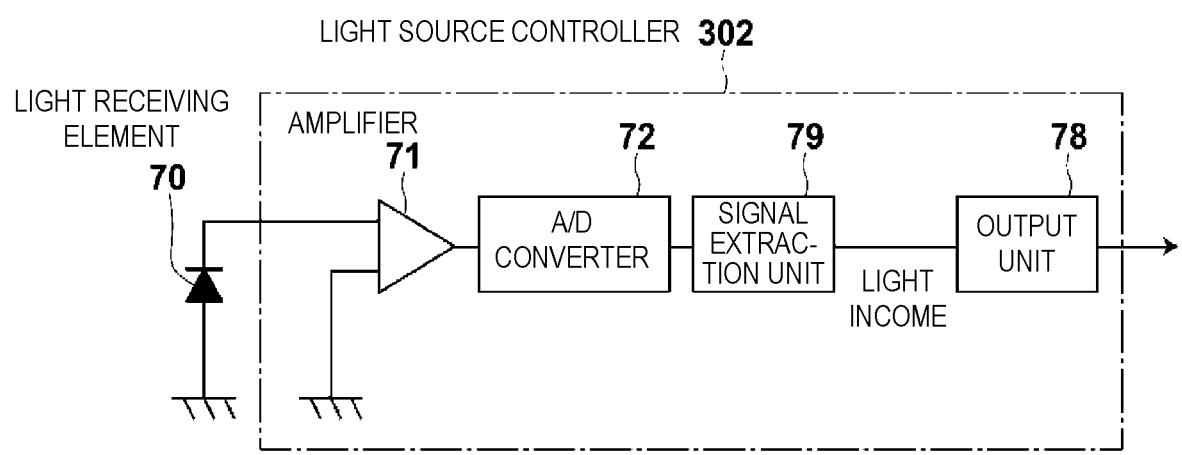
FIG. 10 is a schematic view of a light source controller of a droplet timing sensor according to Embodiment 2.

Next, with reference to FIGS. 10 and 11, a timing sensor according to Embodiment 2 will be described. The timing sensor of this embodiment has a configuration in which, for example, the light source controller 301 in FIG. 8 is replaced by a light source controller 302 in FIG. 10. The light source controller 302 is different from the light source controller 301 in FIG. 8 in that it includes a signal extraction unit 79 instead of the statistical processing unit 76 and the average value calculation unit 73.

4.2 Operation of Embodiment 2

Figure 11:
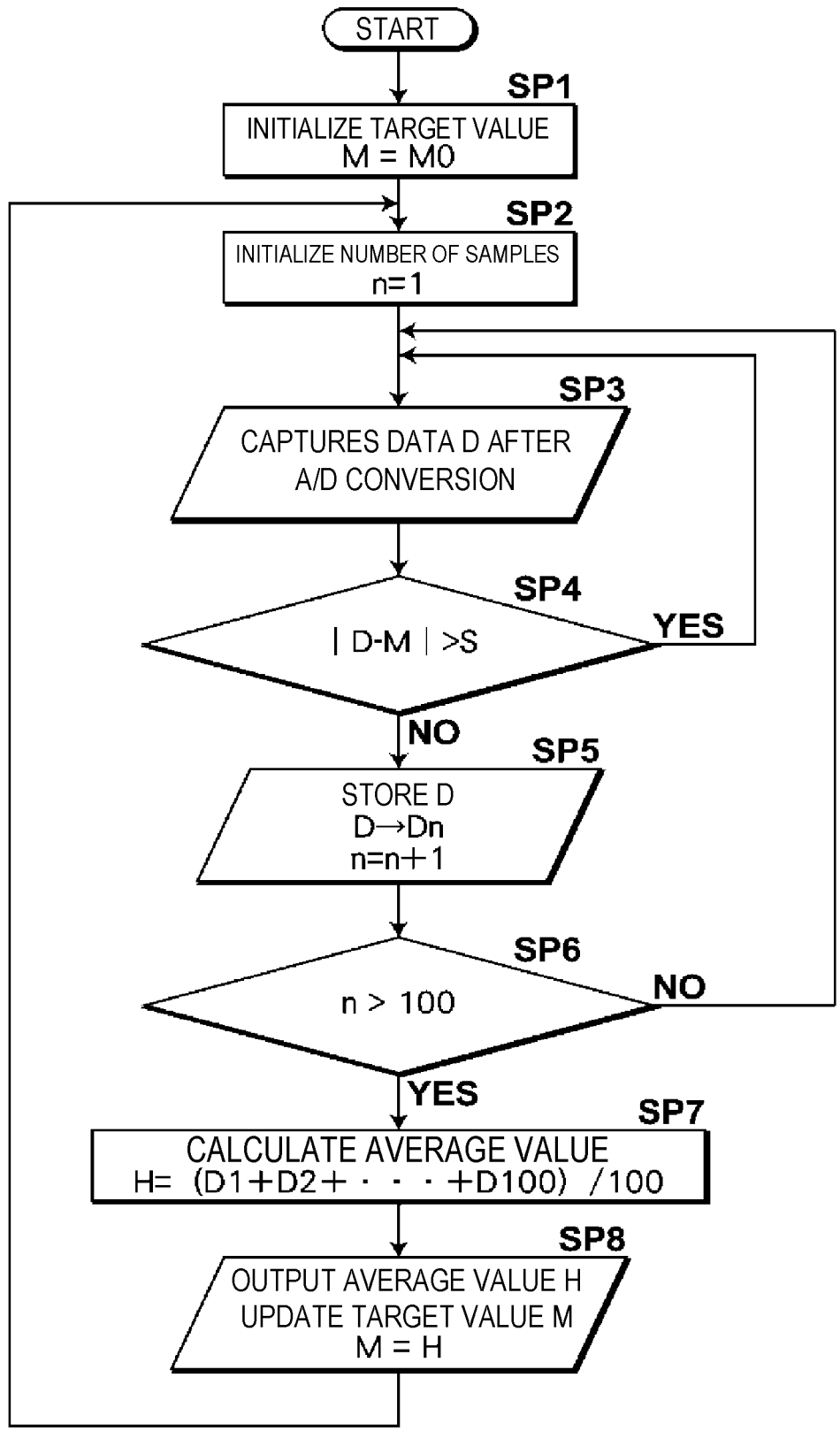
FIG. 11 is a flowchart of processing performed by the droplet timing sensor according to Embodiment 2.

FIG. 11 is a flowchart of processing performed by the signal extraction unit 79. Now, with reference to FIG. 11, the processing performed by the signal extraction unit 79 will be described. When starting the processing, in step SP1, the signal extraction unit 79 first initializes a target value M and sets M=M0. The target value M is a value for determining which range of values of a digitized light amount signal (referred to as "data D" in FIG. 11) sampled at a predetermined cycle by the A/D converter 72 in FIG. 10 is extracted without being discarded.

Then, in step SP2, the signal extraction unit 79 initializes the number of samples n to be 1. Then, in step SP3, the signal extraction unit 79 captures the light amount signal digitized by the A/D converter 72, that is, the data D. Then, in step SP4, the signal extraction unit 79 determines whether or not an absolute value |D−M| of a difference between the data D and the target value M is larger than a predetermined threshold S. When |D−M|>S is satisfied, the signal extraction unit 79 discards the data D and returns to step SP3, and newly captures next data D.

Then, the signal extraction unit 79 performs the same determination as in step SP4 for the newly captured data D. When it is determined that |D−M|>S is not satisfied, in step SP5, the signal extraction unit 79 stores the data D as data Dn on an nth sample. The data D is stored in, for example, an internal memory or the like of the light source controller 302. Then, in step SP5, the signal extraction unit 79 increments the number of samples n by one to be n+1.

Then, in step SP6, the signal extraction unit 79 determines whether or not the number of samples n has reached a predetermined upper limit of the number of samples. Now, a case of the upper limit K=100 will be described. In this case, the signal extraction unit 79 determines whether or not n>100 is satisfied. If n>100 is not satisfied, the signal extraction unit 79 repeats the processes in step SP3 and thereafter. When n>100 is satisfied, in step SP7, the signal extraction unit 79 then calculates an average value H of 100 data D. Thus, in step SP7, after the 100 data D are accumulated, the average value H is calculated. Then, in step SP8, the signal extraction unit 79 outputs the average value H as a light income, and replaces the target value M with the average value H. Then, the process flow returns to step SP2, and the processes in step SP2 and thereafter are repeated.

4.3 Effect of Embodiment 2

As described above, in this embodiment, only data D close to data D at maximum frequency can be easily extracted and used for controlling a light emission amount of a light source 40 (see FIG. 1). This embodiment allows faster processing than in the case of performing statistical processing as in Embodiment 1.

5. Embodiment 3

5.1 Configuration of Embodiment 3

Figure 12:
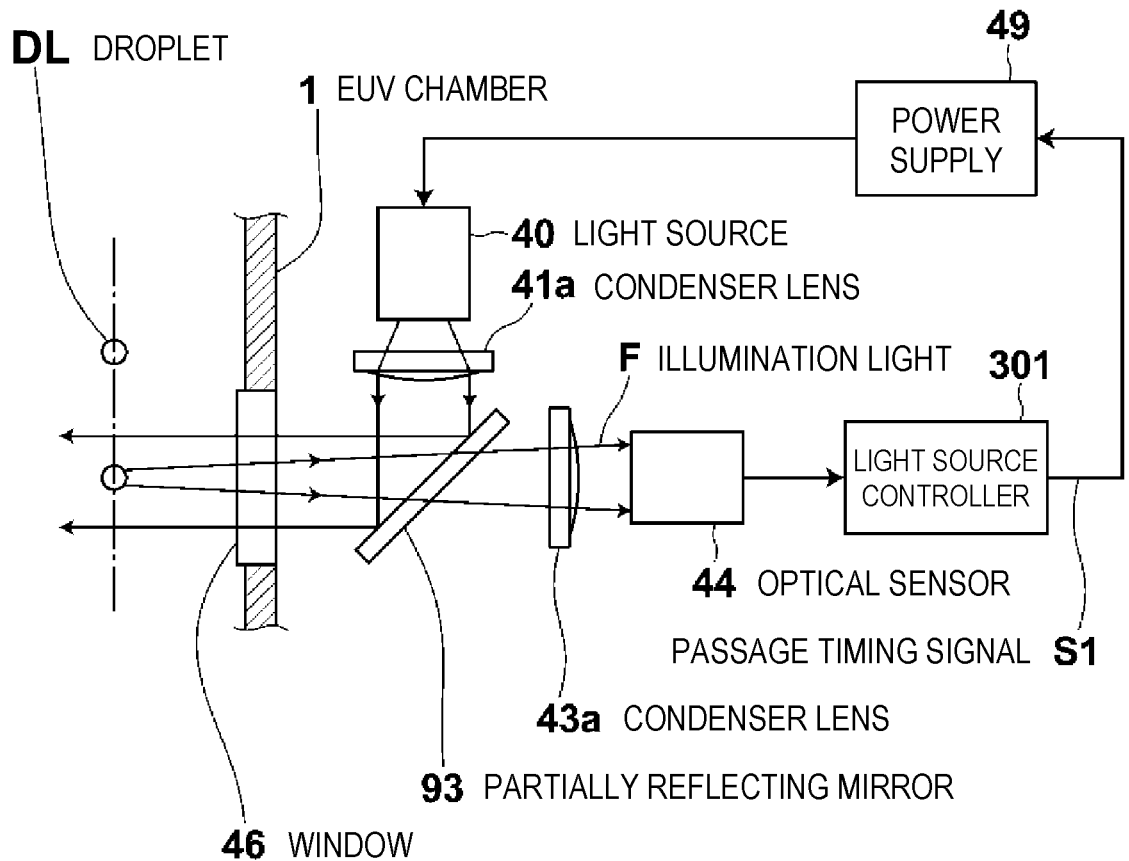
FIG. 12 is a schematic view of a droplet timing sensor according to Embodiment 3.

Next, with reference to FIGS. 12 and 13, a timing sensor according to Embodiment 3 will be described. FIG. 12 is a schematic side view of a light source 40 and an optical sensor 44 and therearound of the timing sensor according to this embodiment. The timing sensor of this embodiment obtains a passage timing signal S1 based on an illumination light F reflected by a droplet DL. Specifically, the timing sensor of this embodiment includes a partially reflecting mirror 93 configured to partially reflect the illumination light F generated from the light source 40 so that the illumination light F travels toward the droplet DL, and partially transmit the illumination light F reflected by the droplet DL. The light source controller 301 has the same configuration as the light source controller 301 in FIG. 8.

5.2 Operation of Embodiment 3

In this embodiment, the illumination light F reflected by the droplet DL is detected by the optical sensor 44. Other operations are essentially the same as those of the timing sensor of Embodiment 1.

5.3 Effect of Embodiment 3

Figure 13:
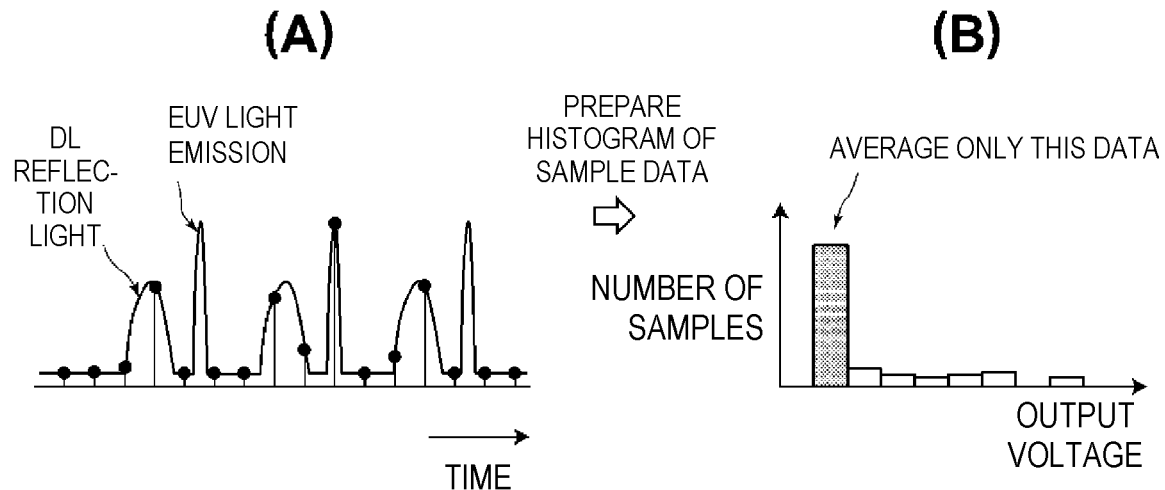
FIG. 13 illustrates, at (A) and (B), an action of the droplet timing sensor in FIG. 12.

(A) of FIG. 13 shows an outline waveform of a light amount signal amplified by an amplifier 71 (see FIG. 8) of the light source controller 301, and shows sampling points in sampling of the light amount signal by an A/D converter 72A with black dots. (B) of FIG. 13 shows an example of a histogram prepared by a statistical processing unit 76 (see FIG. 8). As shown in (A) of FIG. 13, the light amount signal is subjected to disturbance caused by a DL reflection light, that is, the illumination light F reflected by the droplet DL and disturbance caused by EUV light emission. However, also in this embodiment, as in Embodiment 1, the statistical processing unit 76 prepares a histogram of the light amount signal, and extracts only the light amount signal in a class at maximum frequency from the histogram. Then, an average value calculation unit 73 calculates an average value of the extracted signal only, and outputs the average value as a light income. Thus, a light emission amount of the light source 40 is favorably controlled to a proper value at which the signal is not influenced by the disturbance.

6. Embodiment 4

6.1 Configuration of Embodiment 4

Figure 14:
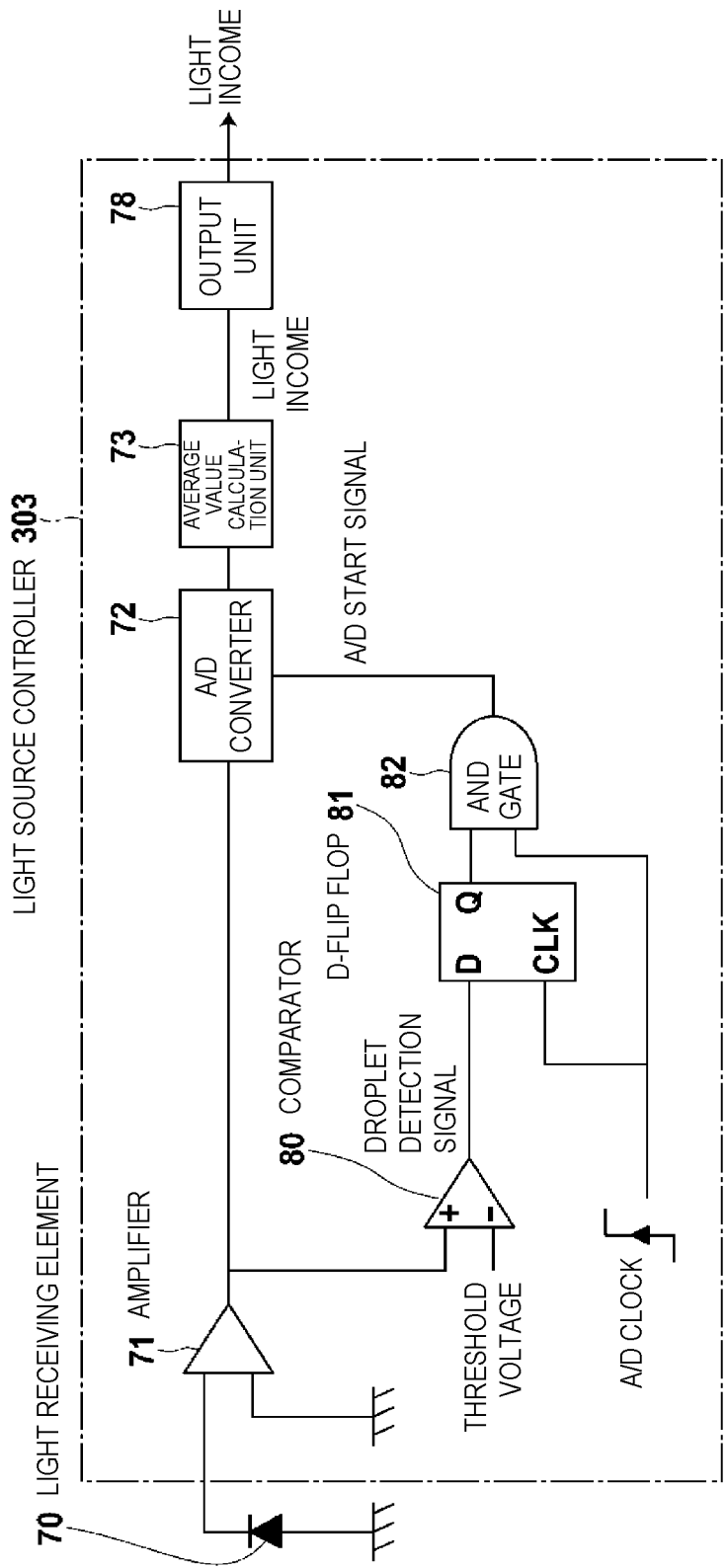
FIG. 14 is a schematic view of a light source controller of a droplet timing sensor according to Embodiment 4.

Next, with reference to FIGS. 14 and 15, a timing sensor according to Embodiment 4 will be described. FIG. 14 shows a light source controller 303 of the timing sensor according to this embodiment. The light source controller 303 includes an amplifier 71, an A/D converter 72, and an average value calculation unit 73 as in FIG. 8. The light source controller 303 further includes a comparator 80 configured to compare an output of the amplifier 71 and a threshold voltage, a D-flip flop 81 configured to receive a droplet detection signal output from the comparator 80 at a D terminal and receive an A/D clock at a clock (CLK) terminal, and an AND gate 82 to which an output from a Q terminal of the D-flip flop 81 and the A/D clock are input. As described above, in this embodiment, an AND output of a signal obtained by synchronizing the droplet detection signal with the A/D clock via the D-flip flop 81 and the A/D clock is an A/D start signal for causing the A/D converter 72 to start an A/D conversion.

6.2 Operation of Embodiment 4

Figure 15:
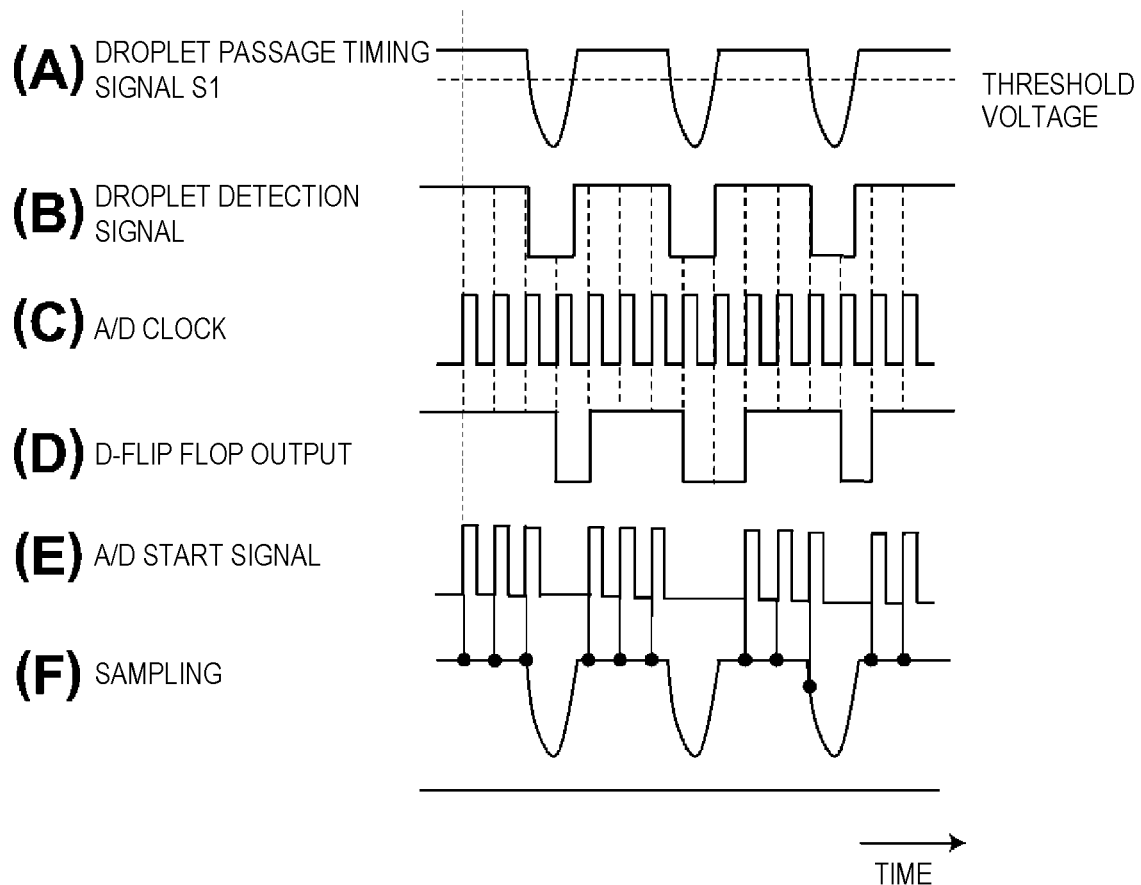
FIG. 15 illustrates, at (A), (B), (C), (D), (E) and (F), an action of the light source controller in FIG. 14.

(A) of FIG. 15 shows an outline waveform of a droplet passage timing signal S1 output from a light receiving element 70 and amplified by the amplifier 71, (B) of FIG. 15 shows an outline waveform of the droplet detection signal output from the comparator 80, (C) of FIG. 15 shows an outline waveform of the A/D clock, (D) of FIG. 15 shows an outline waveform of an output of the D-flip flop 81, (E) of FIG. 15 shows an outline waveform of the A/D start signal input from the AND gate 82 to the A/D converter 72, and (F) of FIG. 15 shows timing of light amount signal sampling performed by the A/D converter 72.

6.3 Effect of Embodiment 4

As shown in (E) and (F) of FIG. 15, in this embodiment, in a period when a light amount signal is reduced by passage of a droplet DL, the A/D converter 72 does not sample the light amount signal. Specifically, the light amount signal reduced by the passage of the droplet DL is not sampled. Thus, also in this case, a light emission amount of a light source 40 is controlled to a proper value without being influenced by disturbance of the passage of the droplet DL.

7. Embodiment 5

7.1 Configuration of Embodiment 5

Figure 16:
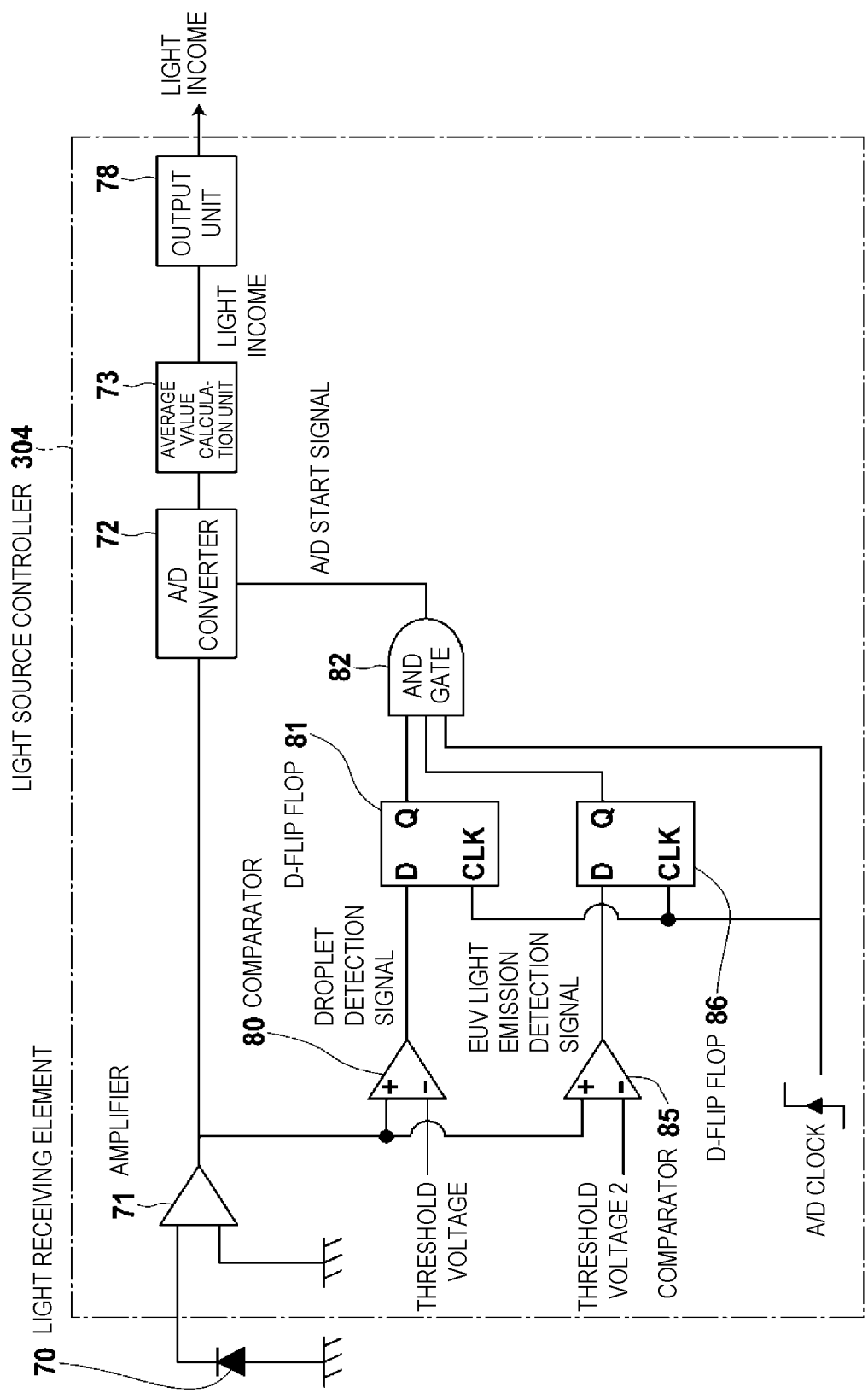
FIG. 16 is a schematic view of a light source controller of a droplet timing sensor according to Embodiment 5.

With reference to FIGS. 16 and 17, a timing sensor according to Embodiment 5 will be described. FIG. 16 shows a light source controller 304 of the timing sensor according to this embodiment. The light source controller 304 includes, in addition to the configuration of the light source controller 303 in FIG. 14, a comparator 85 configured to compare an output of an amplifier 71 and a second threshold voltage, and a D-flip flop 86 configured to receive an EUV light emission detection signal output from the comparator 85 at a D terminal and receive an A/D clock at a clock (CLK) terminal. An output from the D-flip flop 86 is input to an AND gate 82 together with an output of a D-flip flop 81 and an A/D clock. As described above, in this embodiment, an AND output of a signal obtained by synchronizing a droplet detection signal with the A/D clock via the D-flip flop 81 and the A/D clock is an A/D start signal for causing the A/D converter 72 to start an A/D conversion.

7.2 Operation of Embodiment 5

(A) of FIG. 17 shows an outline waveform of a droplet passage timing signal S1 output from a light receiving element 70 and amplified by an amplifier 71, (B) of FIG. 17 shows an outline waveform of the droplet detection signal output from the comparator 80, (C) of FIG. 17 shows an outline waveform of the A/D clock, (D) of FIG. 17 shows an outline waveform of an output of the D-flip flop 86 influenced by an EUV light, (E) of FIG. 17 shows an outline waveform of an output of the D-flip flop 81 influenced by passage of a droplet, (F) of FIG. 17 shows an outline waveform of the A/D start signal input from the AND gate 82 to the A/D converter 72, and (G) of FIG. 17 shows timing of light amount signal sampling performed by the A/D converter 72.

7.3 Effect of Embodiment 5

As shown in (F) and (G) of FIG. 17, in this embodiment, in a period when a light amount signal is reduced by the passage of the droplet DL or increased by EUV light emission, the A/D converter 72 does not sample the light amount signal. Specifically, the light amount signal reduced by the passage of the droplet DL or increased by the EUV light emission is not sampled. Thus, also in this case, a light emission amount of a light source 40 is controlled to a proper value without being influenced by disturbance of the passage of the droplet DL or the EUV light emission.

The above descriptions are intended to be illustrative only and not restrictive. Thus, it will be apparent to those skilled in the art that modifications may be made in the embodiments in the present disclosure without departing from the scope of the appended claims.

The terms used throughout the specification and the appended claims should be interpreted as "non-limiting." For example, the term "comprising" or "comprised" should be interpreted as "not limited to what has been described as being comprised." The term "having" should be interpreted as "not limited to what has been described as having". Further, the modifier "a/an" described in the specification and the appended claims should be interpreted to mean "at least one" or "one or more".

What is claimed is:

1. A droplet timing sensor that detects timing when a droplet passes through a predetermined position, the droplet being intermittently supplied into a chamber of an extreme ultraviolet light generating apparatus and irradiated with a laser beam to generate an extreme ultraviolet light, the droplet timing sensor comprising:
   a light source unit configured to irradiate the droplet supplied into the chamber with an illumination light at the predetermined position;
   a light receiving unit configured to receive the illumination light having passed through the predetermined position and detect a change in a light income; and
   a light source controller configured to obtain a frequency distribution of light incomes measured multiple times with time, and control an output of the light source unit based on a light income at maximum frequency.

2. The droplet timing sensor according to claim 1, wherein the light receiving unit measures the light income multiple times at a predetermined sampling cycle, and
   the sampling cycle is shorter than a passage cycle of the droplet through the predetermined position.

3. The droplet timing sensor according to claim 2, wherein the sampling cycle is half or less of the passage cycle of the droplet through the predetermined position.

4. The droplet timing sensor according to claim 2, wherein the sampling cycle is one fifth or less of the passage cycle of the droplet through the predetermined position.

5. The droplet timing sensor according to claim 2, wherein the sampling frequency is 500 kHz or higher.

6. The droplet timing sensor according to claim 1, wherein the light source controller obtains a plurality of light incomes at the maximum frequency, and controls an output of the light source unit based on an average value of the plurality of light incomes.

7. A droplet timing sensor that detects timing when a droplet passes through a predetermined position, the droplet being intermittently supplied into a chamber of an extreme ultraviolet light generating apparatus and irradiated with a laser beam to generate an extreme ultraviolet light, the droplet timing sensor comprising:
- a light source unit configured to irradiate the droplet supplied into the chamber with an illumination light at the predetermined position;
- a light receiving unit configured to receive the illumination light having passed through the predetermined position and detect a change in a light income; and
- a light source controller configured to extract only a light income having a difference from a target value within a predetermined value from light incomes measured multiple times with time, and control an output of the light source unit based on the extracted light income.

8. The droplet timing sensor according to claim 7, wherein the light source controller obtains a plurality of the extracted light incomes, and controls an output of the light source unit based on an average value of the plurality of light incomes.

9. The droplet timing sensor according to claim 7, wherein the light source controller obtains the extracted light incomes and then updates the target value to the average value of the extracted light incomes.

10. A droplet timing sensor that detects timing when a droplet passes through a predetermined position, the droplet being intermittently supplied into a chamber of an extreme ultraviolet light generating apparatus and irradiated with a laser beam to generate an extreme ultraviolet light, the droplet timing sensor comprising:
- a light source unit configured to irradiate the droplet supplied into the chamber with an illumination light at the predetermined position;
- a light receiving unit configured to receive the illumination light having passed through the predetermined position and detect a change in a light income; and
- a light source controller configured to sample a signal output from the light receiving unit with time only in a period except when the signal is influenced by passage of the droplet to obtain a light income, and control an output of the light source unit based on the light income.

11. The droplet timing sensor according to claim 10, wherein the light source controller is configured to sample the signal only in a period except when the signal is influenced by passage of the droplet and also when the light amount signal is influenced by emission of the extreme ultraviolet light.

12. The droplet timing sensor according to claim 1, wherein the light receiving unit is placed in a position where the illumination light to be received thereby is blocked by the droplet.

13. The droplet timing sensor according to claim 1, wherein the light receiving unit is placed in a position to receive the illumination light reflected by the droplet.

* * * * *